Sept. 4, 1928.                                                1,683,363
H. LORD
GAITER FOR USE ON SUSPENSION SPRINGS
Filed June 19, 1926          2 Sheets-Sheet 2
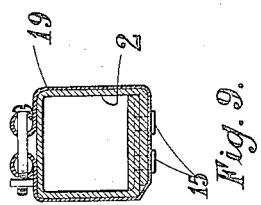
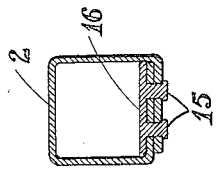
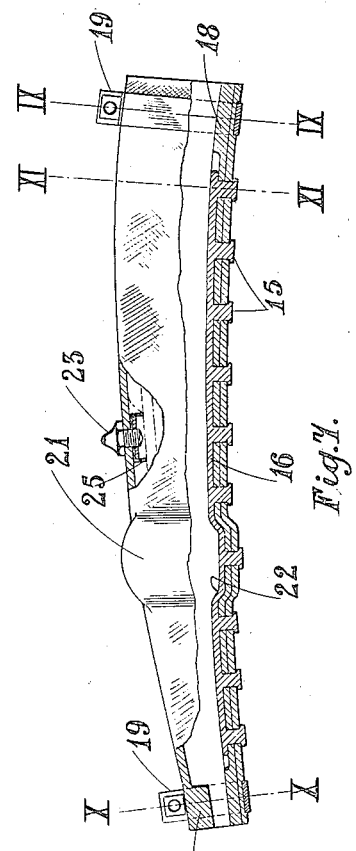
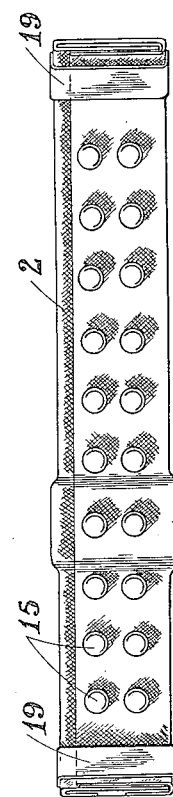
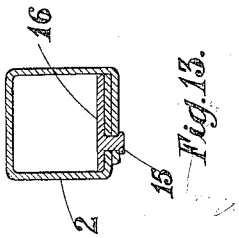
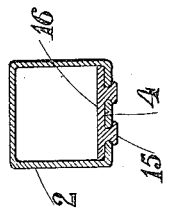
Herbert Lord.
Inventor
his Attorney.

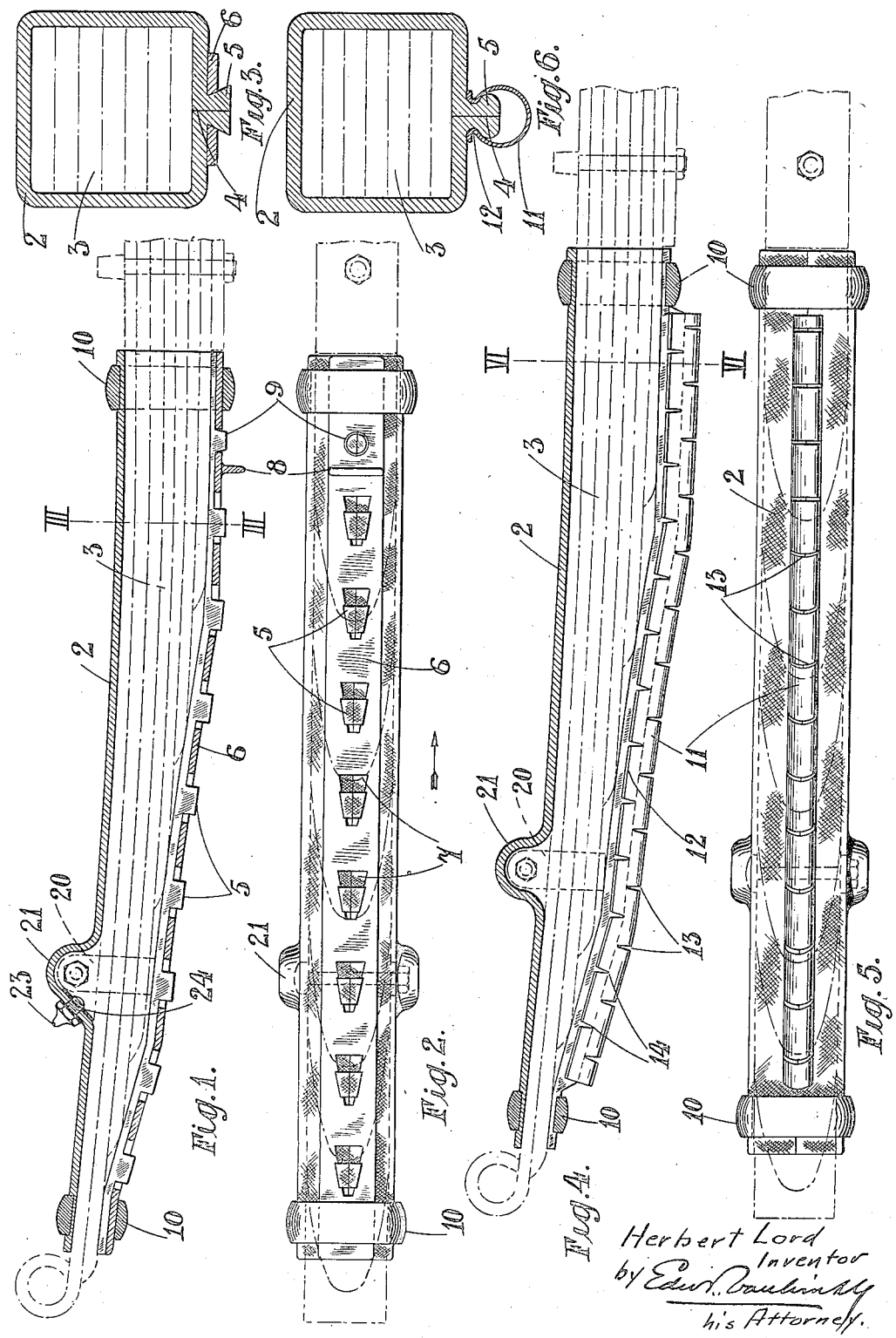

Patented Sept. 4, 1928.

1,683,363

UNITED STATES PATENT OFFICE.

HERBERT LORD, OF COVENTRY, ENGLAND.

GAITER FOR USE ON SUSPENSION SPRINGS.

Application filed June 19, 1926, Serial No. 117,078, and in Great Britain June 23, 1925.

This invention relates to gaiters for use on suspension springs, of the kind in which the gaiter is spilt longitudinally to enable it to be fitted or removed without disturbing the spring shackle pins or the like.

According to this invention, a flexible plate is adapted to engage and to hold together the edges of the gaiter.

In the accompanying drawings which illustrate various methods of carrying out the invention, Figure 1 is a sectional elevation of one form of gaiter shown in position on the spring, Figure 2 is a plan of the underside, and Figure 3, to a larger scale, is a cross section of the gaiter on the line III—III of Figure 1, Figure 4 is a view similar to Figure 1 showing a modification, of which Figure 5 is a plan of the underside, whilst Figure 6 is an enlarged cross section on the line VI—VI of Figure 4, Figure 7 is a part-sectional elevation of a further modification of the gaiter omitting the spring, of which Figure 8 is a plan of the underside, Figures 9, 10 and 11 are cross sections at the corresponding section planes on Figure 7, and Figues 12 and 13 are each cross sections showing slight modifications of the gaiter illustrated in Figures 7 and 8.

Like numerals indicate like parts throughout the drawings.

In the method of carrying out the invention illustrated by Figures 1—3, the gaiter is in the form of a split sleeve 2 of rubber or rubber reinforced with fabric, and preferably moulded to the required shape of the spring 3 so as to fit the latter closely.

The split 4 is preferably located on the underside of the gaiter, and spaced along the meeting edges are projections 5 whose adjacent faces abut when the edges of the gaiter are drawn tightly together. These projections are of truncated wedge form with undercut inclined sides and the apices all point in the same direction, in this example towards the end of the spring.

The connecting device is a sheet or strip of thin flexible material 6, for example, celluloid, steel, or other metal, and wedge-shaped apertures 7 are cut at intervals in it and are somewhat longer than the projections 5, but of similar wedge form to engage the undercut sides of the projections. This strip 6 is laid against the gaiter so that the projections 5 on the latter extend through the apertures 7 in it, after which, longitudinal movement of the connecting device in the direction of the arrow in Figure 2 creates a gripping action on the undercut sides of the projections and acts securely to draw the edges of the gaiter together. The ends of this strip may be provided with projections such as 8 to facilitate the longitudinal connecting or disconnecting movements, and the edges of the wedge-shaped apertures 7 may be suitably reinforced to prevent their cutting the projections 5. To provide a locking means for the strip, a stud or like projection 9 may be provided on the gaiter adapted to engage a corresponding hole in the strip 6 when the latter is in its effective locking position.

In addition to sealing the ends of the gaiter, it serves also to provide shoulders adapted to abut the ends of the locking strip 6 and to render the latter more secure, particularly under severe flexure of the spring. If preferred, however, the clip may embrace the strip as shown in Figures 1 and 2.

As an alternative (Figures 4, 5 and 6) the projections 5 may be of a part-circular or bulbous or other suitable section extending continuously in the form of a ridge along the split, and preferably gashed transversely at intervals to ensure flexibility, or if preferred the projections may be in sections closely arranged. The division of the gaiter would extend centrally through this projecting ridge and the two parts thereof would be drawn together, preferably by a longitudinally split tubular spring 11 or springs forming a clip of C-profile when viewed endwise. This could be bent from a flat plate and be sprung or drawn into place and would preferably have its acting edges reinforced or otherwise rounded as at 12 to avoid cutting into the material of the projections.

To give this tube flexibility lengthwise, it may be gashed transversely at 13 and 14 from opposite sides (i. e. the split side and that opposite to it, as clearly shown in Figure 4), the gashes being in staggered relationship with one another. If preferred this tubular connecting device 11 might also be made of celluloid, and in general its grip will be sufficient to prevent its accidental displacement.

In the alternative construction shown in Figures 7-11 the edges of the split gaiter are perforated to engage studs. or buttons 15 which are provided on a strip of material 16 laid along the underside of the spring. As in the previous construction, the split edges may abut one another as shown at 4 in Figure 12, or they may be arranged to overlap one another as clearly shown in the cross sectional views Figures 9, 11 and 13. In the latter figure, however, it will be noticed that only a single row of studs 15 is employed, but where the edges abut as in Figure 12, it will be evident that two rows, one on each side of the split, are necessary.

To ensure the ends of the gaiter making a fluid-tight engagement with the spring they may be provided with filling pieces, such as 17, so shaped as to fill up the spaces left either by the taper ends of the spring leaves (which may be at the upper or the underside of the spring according to the nature of the latter) or the spaces at the root of the spring such as are left at the end of the stud carrying the strip 16, the filling piece for this being shown at 18.

The ends of the gaiters with the filling-in pieces are compressed against the spring by adjustable clips such as 19, and if necessary grooves or recesses may be provided around the gaiter to receive the clips and to prevent their displacement endwise.

The side walls of the gaiter are preferably thinner than the top and bottom walls so that when lubricant is injected under pressure they expand first, and consequently the lubricant accumulates at the edges of the leaves of the springs and more readily enters between them.

Where there is a clip such as 20 around the spring, the gaiter is suitably shaped as at 21 to embrace it. The strip 16 carrying the studs is also shaped as at 22 to clear the clip. If preferred this strip could be extended at one or both ends beyond the region of the clips 19 so that the grip of the latter would hold it longitudinally.

For the introduction of lubricant into the gaiter an aperture is provided, and mounted within it is a suitable nipple 23 for engagement by a grease gun or the like. The washer 24 which backs up the nipple engages the spring 3 and clip 20 in Figure 1, preventing the inner end of the nipple being pressed on the spring and thus obstructed by the thrust of the gun. In Figure 7 the different arrangement of spring necessitates some modification and therefore a flanged washer plate, such as 25, is provided to space the end of the nipple from the spring.

From the foregoing it will be seen that the edges of the gaiter can be very quickly drawn together to make a fluid-tight joint by any of the proposed constructions, and in each case provision is made for the movements of the spring without affecting the connecting device.

If desired the abutting or overlapping edges may be fabric, reinforced and stiffened, as by means of wires inserted longitudinally.

What I claim as my invention and desire to secure by Letters Patent of the United States is:—

1. A cover for a vehicle spring comprising a piece of flexible material provided with wedge shaped projections at intervals along the edges thereof, a flexible closure plate provided with corresponding wedge shaped apertures adapted to engage the aforesaid projections.

2. A spring gaiter as claimed in claim 1, in which the ends of the gaiter are provided with moulded end-pieces adapted to fit the spring and prevent leakage of lubricant at the ends of the gaiter, substantially as set forth.

3. The combination with a longitudinally split gaiter for use on suspension spring provided with wedge shaped projections at intervals along the edges thereof, of a flexible plate adapted to be engaged by the sides of corresponding wedge shaped apertures in the flexible plate.

In testimony whereof I have signed my name to this specification.

HERBERT LORD.